US008700006B2

(12) United States Patent
Ni

(10) Patent No.: US 8,700,006 B2
(45) Date of Patent: Apr. 15, 2014

(54) METHOD AND SYSTEM FOR RECOMMENDING CONTENT AMONG MOBILE PHONE USERS

(75) Inventor: Xianle Ni, Beijing (CN)

(73) Assignee: NQ Mobile Lux S.A., Luxembourg (LU)

( * ) Notice: Subject to any disclaimer, the term of this patent is extended or adjusted under 35 U.S.C. 154(b) by 0 days.

(21) Appl. No.: 13/132,579

(22) PCT Filed: Oct. 15, 2009

(86) PCT No.: PCT/CN2009/074457
§ 371 (c)(1),
(2), (4) Date: Aug. 19, 2011

(87) PCT Pub. No.: WO2010/063200
PCT Pub. Date: Jun. 10, 2010

(65) Prior Publication Data
US 2011/0300834 A1  Dec. 8, 2011

(30) Foreign Application Priority Data

Dec. 4, 2008 (CN) .......................... 2008 1 0227980

(51) Int. Cl.
*H04W 88/02* (2009.01)
(52) U.S. Cl.
USPC ......................................................... 455/414
(58) Field of Classification Search
USPC ........... 455/414; 707/707, 750; 713/151, 164, 713/193; 709/203
See application file for complete search history.

(56) References Cited

U.S. PATENT DOCUMENTS

2004/0066591 A1* 4/2004 Medeiros et al. ............... 361/23
2005/0021937 A1* 1/2005 Lambert ....................... 713/151
2006/0235873 A1* 10/2006 Thomas ....................... 707/102
2008/0243733 A1 10/2008 Black
2009/0059922 A1* 3/2009 Appelman et al. ............ 370/390
2009/0281872 A1* 11/2009 Kalaboukis ..................... 705/10
2011/0211813 A1* 9/2011 Marks ........................... 386/297
2011/0264527 A1* 10/2011 Fitzpatrick et al. ........ 705/14.55
2012/0205436 A1* 8/2012 Thomas et al. ............... 235/375

FOREIGN PATENT DOCUMENTS

| CN | 1322439 A | 11/2001 |
|---|---|---|
| CN | 1682224 A | 10/2005 |
| CN | 101315634 A | 12/2008 |
| WO | 0146843 A2 | 6/2001 |
| WO | 2004023358 A1 | 3/2004 |

* cited by examiner

*Primary Examiner* — Diane Mizrahi
(74) *Attorney, Agent, or Firm* — Baker & McKenzie LLP

(57) ABSTRACT

A method and system for recommending content among mobile phone users are provided. The method includes: recommendation information is selected and transmitted to a recommendation module as a parameter; the recommendation module combines the recommendation information, the mobile phone number of the user being recommended to, and optional recommendation reasons into a recommendation message, and transmits said message to the mobile phone of the user being recommended to; the mobile phone of the user being recommended to receives the recommendation message, and a monitor and download module which is running all through at the background monitors and analyzes this message; according to the analyzed content, the monitor and download module pops up a download reminder, asks the user for confirmation, and obtains URL of relevant content, then the user downloads the content appointed by the URL from the server. Application of the present invention solves the problem that it is difficult for users to share contents among each other, by adapting at the server, adding shortcut mode at the mobile phone side, then transmitting the recommendation message to the user being recommended to; the mobile phone side downloads the matching contents from the server automatically as soon as the recommendation message is received.

14 Claims, 3 Drawing Sheets

METHOD AND SYSTEM FOR RECOMMENDING CONTENT AMONG MOBILE PHONE USERS

This application is a National Stage Application under 35 U.S.C. §371 from PCT/CN2009/074457, filed Oct. 15, 2009, which claims priority under 35 U.S.C. §119(a)-(d) to Chinese Application No. CN200810227980.3, filed on Dec. 4, 2008, each of which is hereby incorporated by reference in its entirety for all purposes.

FIELD OF THE INVENTION

The present invention relates to the field of mobile communication, more particularly, to method and system for recommending content among mobile phone users.

BACKGROUND OF THE INVENTION

At present, there exist a lot of mobile phone operating systems, the most popular ones includes, such as Symbian, Windows Mobile, Linux, Palm OS, and the like. Meanwhile, these operating systems themselves evolves into various versions, and some of those versions are not compatible with each other. In addition, operating systems are updating frequently. Therefore, it would be almost impossible for a commend user to share or recommend a mobile phone software to others, due to the diversity and complex of the mobile phone operation systems (including different OS types and the incompatible versions thereof). On the other hand, for the developers of application software, it is usually necessary to support as many operating systems and the corresponding versions as possible to maximally cover more potential users, namely, providing multiple software installation packages corresponding to each operating system and version.

Furthermore, downloading content from a mobile phone or recommending/sharing software among mobile phone users requires complicated operations, which also makes it difficult for common users. If an user wants to recommend a software to his/her friends, the process may include: obtaining the downloading URL of the software by certain means firstly, sending the URL to the friends, and then the friends receive the URL, opening a web browser, inputting the URL and entering into the downloading interface of said software, and finally the friend look into a list of installation packages for various platform and choosing a suitable version of said software being compatible to his/her mobile phone model to download. This complicated process imposes many obstacles to common users: for example, obtaining the URL of said software installed in the mobile phone, which requires using a search engine to obtain the downloading URL of said software, finding out the browser software in the mobile phone, while the software is usually not in the first level menu, and requiring the user to enter a deeper menu, inputting URL which are usually time-consuming and easy to make mistakes. As for choosing a compartable version, which might be easy to an application software developer, but it will be hard for a common user to find out what exactly the mobile phone model is. Furthermore, it requires a lot of hard works for an application software developer to keep up with the updating of phone models and/or OS versions, because the upgrading speed of mobile phones becomes very fast in recent years, so, there would be nothing to surprise if the user's particular phone model is not in the supporting list. As a result of the mobile phone model diversity and poor OS capability, etc., it is complicated and inconvenient to download content from a mobile phone, or to recommend/share software among mobile phone users.

The present invention provides technical solutions at least to solve or eliminate the above problems.

SUMMARY OF THE INVENTION

The present invention solves the problem of software compatbility among different mobile phone models. In the present invention, a server running at the background matches mobile phone models automatically when a user wants to recommend certain application to other users, and thus the user needs not to worry about it. In addition, if a specific model version of certain software cannot be found, another software with similar function may be recommended, for example, if there is no Linux version for a reading software, 'reader', but there is Linux version for reading software 'abc', then the server may inform the user to install 'abc' as an alternative.

Furthermore, the present invention can easily recommend/share software among mobile phone users. The recommender does not need to firstly search the downloading URL of the software, and the user receiving the recommendation only needs to press a 'OK', then a "recommendation apparatus" will complete the remaining process.

Application of the present invention solves the problem for users to share contents among each other, by matching the contents at a server end, providing a mobile phone shortcut mode to users (e.g. providing a system menu 'recommendation' when the user selecting some application on the desktop of the mobile phone; adding said menu item on the application to help sharing; providing the menu item 'recommendation' when selecting a file in the resources browser) at the mobile phone side, then transmitting the recommendation message (including various means such as short message, multimedia message, email, and IM etc.) to the user receiving the recommendation; the mobile phone side downloads the matching contents from the server automatically as soon as the recommendation message is received.

According to one aspect of the present invention, a method for recommending content among mobile phone users is provided, the method comprising the steps of extracting recommendation information, and transmitting said information to a recommendation module as a parameter; the recommendation module integrating the information including: recommendation information, the mobile phone number of the user to receive the recommendation, and an optional recommendation reason, into a recommendation message, and sending the recommendation message to a receiving user; the mobile phone of the receiving user receives the recommendation message, and a monitoring and downloading module which keeps running at the background for monitoring and analyzing this message; according to a analyzing result, the monitor and download module pop up a download reminder, requiring the user's confirmation, and obtaining URL of relevant content, then automatically downloading the content associated to the URL from the server. Subsequently, corresponding operation is performed according to the type of the content: performing installation operation if it is software package; starting up a player to display if it is an audio/video file; starting up the browser to browse if it is a webpage.

The recommendation module issues a calling interface to external for other programs to be called on (including applications built-in the operating system and applications developed by the third party, etc.).

Wherein obtaining URL of relevant content comprises: transmitting information of content name, version number, mobile phone model, languages supported by the mobile phone and the optional recommendation reasons to the server in the case that the recommendation is software or other content; the server searching in its catalogue database after receiving the information; reverting the URL of the content version in the case there is directly corresponding content version, and reverting a URL of the content with most similar functions according to the recommendation reasons, type or keywords, etc. to the user in the case there is no directly corresponding content version; and picking up the URL of the content directly from the recommendation message if the recommendation is a webpage.

In the method of the present invention, the extracted recommendation information comprises recommendation type, content name, or URL browsed by the present browser, and the recommendation type includes webpage, software or others, the content name includes software name, version number, web title or other content names.

In the method of the present invention, the user can initiate recommending operation at least by means of:

1) selecting a menu item 'recommendation' of the present system menu when browsing some application in the applications list of the mobile phone;

2) selecting a menu item 'recommendation' in the menu of application software;

3) selecting the present menu item 'recommendation' after selecting some file in resources browser or file manager; and 4) selecting a menu item 'recommendation' in web browser.

According to another aspect of the invention, a system for recommending content among mobile phone users is provided, based on framework of mobile phones and server, wherein the mobile phones recommending contents to each other include a portable recommendation apparatus, and the portable recommendation apparatus comprising: a recommendation module for receiving recommendation request of various source/manners, displaying recommendation interface, configuring recommendation message and transmitting it to the mobile phone being recommended to; a monitor and download module which is running all through at the background monitoring inbox of the system, and then performing analysis if it conforms to the predefined format, reminding the user whether to download or not and performing the subsequent downloading operation; and a server comprising category search information of various contents and the corresponding contents, performing the functions of catalogue search and storing/downloading.

In the system of the invention, the server comprises software-related information database and corresponding software content database; the software-related information database performing the function of catalogue search of the software, including at least the information of content name, version number, mobile phone model, supported languages and similarity with other software; and the software content database performing the function of storing/downloading of the software.

In the system of the invention, the server is divided into catalogue server and content server, wherein the catalogue server performs the function of catalogue search, and the content server performs the function of storing/downloading.

The content that can be recommended comprises: software, image, audio and video, electronic book, webpage, and the like.

The present invention solves the problem that it is difficult for users to share contents among each other, by adapting at the server, adding shortcut mode (e.g. providing a system menu 'recommendation' when the user selecting some application on the desktop of the mobile phone; adding said menu item on the application for the convenience of share; providing the menu item 'recommendation' when selecting some file in the resources browser) at the mobile phone side, then transmitting the recommendation message (including various means such as short message, multimedia message, email, and IM etc.) to the user being recommended to; the mobile phone side downloads the matching contents from the server automatically as soon as the recommendation message is received.

DETAILED DESCRIPTION OF THE INVENTION

Figures 1A, 1B:
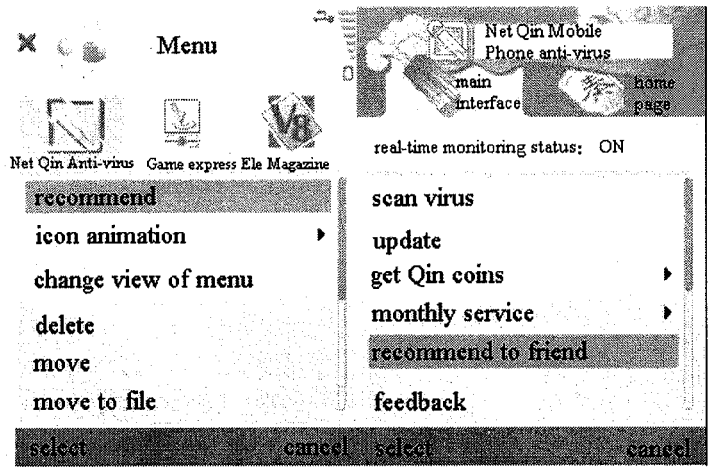
FIG. 1a to FIG. 1d are schematic diagrams showing the adding of shortcut mode at the mobile phone side.

The embodiments will be described hereinafter with reference to the accompanying drawings of the present invention. In the description below, a large amount of details are described for better understanding. However, those skills in the art should know that the present invention is not limited to these details.

Referring to FIG. 1a, FIG. 1b, FIG. 1c and FIG. 1d, adding shortcut at the mobile phone side comprises, for example, on the desktop of the mobile phone, providing a system menu 'recommendation', when the user selecting some application; adding said menu item in the application for the convenience of share; providing a menu item 'recommendation' when selecting some file in the file manager; providing a menu item 'recommendation' when the user browsing some webpage in the web browser.

The user may select the content to recommend by at least one of the following means:

1) Selecting a menu item 'recommendation' of the present system menu when browsing some application in the applications list of the mobile phone. Said menu item can be setup in the system settings.

2) Selecting a menu item 'recommendation' in the menu of application software.

3) Selecting the present menu item 'recommendation' after selecting some file in resources browser (file manager).

4) Selecting a menu item 'recommendation' in the web browser.

The software which initiates the recommendation (such as mobile phone system, application software itself, file manager, and the like) is responsible for extracting a recommendation message, and transferring said message to a 'recommendation module' as a parameter.

The extracted recommendation message may comprise recommendation type, content name, or the URL browsed by the present browser and the like. The recommendation type may include webpage, software or others, and the content name may include software name, version number, web title or other content names.

The 'recommendation module' in the mobile phone displays a recommendation interface, and includes the mobile phone number of the user being recommended to, and may also include other content such as recommendation reasons, etc. The 'recommendation module' configures recommendation message and transfers it after the user inputs the mobile phone number of the user being recommended to and the recommendation reasons (optional). Type of the message may be: short message, multimedia message, and the like.

The recommendation message includes the recommended recommendation information and recommendation reasons (optional), and is transferred to the mobile phone number of the user being recommended to.

In addition, said message further includes a special feature code which is added automatically by the 'recommendation module' so as to be recognized by a monitor and download module.

The mobile phone of the user being recommended to receives the recommendation message, and the 'monitor and download module' which is running all through at the background monitors and analyzes this message.

It can be analyzed from the recommendation information in the recommendation message: recommendation type, content name, URL and optional recommendation reasons, and the like.

According to the analyzed content, the 'monitor and download module' pops up a download reminder (for example, including web title, software name, other content names, and the like), and asks the user for confirmation so as to perform the following steps subsequently.

In the case that the recommendation is software or other content, transmitting the information of content name, version number, mobile phone model, languages supported by the mobile phone and recommendation reasons to the server; the server searching in the catalogue database after receiving the information; reverting the URL of the content version in the case there is directly corresponding content version; reverting the URL of the content with most similar functions according to the recommendation reasons, type or keywords, etc. to the user in the case there is no directly corresponding content version. The user downloads the content appointed by the URL from the server by means of common ftp download or other means. Reminding the user whether to install or not after the downloading, or reminding the user after finishing the installation directly.

The 'monitor and download module' identifies and extracts the information of the mobile phone model, languages supported by the mobile phone and the like automatically.

In the case of recommending software or other contents, if the analyzed content comprises the URL of corresponding content, the 'monitor and download module' may also startup the browser, connect to the network and open the URL to browse, and determine whether to download manually.

The analyzed content comprises a web title and URL if the recommendation is a webpage. The 'monitor and download module' startups the browser, connects to the network and opens said URL to browse.

The content that can be recommended comprises: software, image, audio and video, electronic book, webpage, and the like.

The method for recommending content among users of the invention is described below with reference to one embodiment.

Take the application 'Net Qin Anti-virus' for example, the user selects the application 'Net Qin Anti-virus' in 'menu' of the mobile phone, then selects the menu item 'recommendation' in the system menu, as illustrated in FIG. 1a. At the moment, the program of 'menu' built-in the mobile phone is responsible for extracting the recommendation information, including recommendation type (application/software) and content name (Net Qin Anti-virus, 2.1.3.20), and transferring it to the 'recommendation module' of the mobile phone as a parameter.

The 'recommendation module' of the mobile phone displays a recommendation interface and reminds the user to input (or select from the contact list) the mobile phone number of the user being recommended to. The recommendation interface may also include other contents, such as recommendation reasons and the like, which may be optional. After the user inputs the mobile phone number of the user being recommended to and the recommendation reasons (optional), the 'recommendation module' configures these information as well as the extracted recommendation information into a recommendation message, and adds a special feature code automatically, then transfers it to the mobile phone of the user being recommended to in the form of short message or multimedia message, etc.

The mobile phone of the user being recommended to receives the recommendation message, and the 'monitor and download module' which is running all through at the background monitors and analyzes this message through the additional feature code in the recommendation message. The recommendation type, content name and the optional recommendation reasons can be analyzed from the recommendation message. Subsequently, the 'monitor and download module' pops up a download reminder, including software name and version number, and asks the user for confirmation.

The information of software name, version number, mobile phone model and languages supported by the mobile phone, etc. is transferred to the server automatically after the user's affirmation. The information of the mobile phone model and languages supported by the mobile phone, and the like is identified and extracted by the 'monitor and download module' automatically.

After receiving the information, the server searches in the catalogue database, reverts the URL of the content version if there is directly corresponding content version, reverts the URL of the content with most similar functions according to the recommendation reasons, type or keywords, etc. to the user if there is no directly corresponding content version. The server can be divided into a catalogue server and a content server. The catalogue server performs the function of catalogue search, and the content server performs the function of storing/downloading. In addition, the server can record the request that there is no directly corresponding content version, and search by the function of automatic on-line search, or manually search by the manager.

The user downloads the content appointed by the URL from the server. The user is reminded whether to install or not after downloading. The user may download by means of common ftp download or other means. Alternatively, the user is reminded after the installation is finished directly.

Figure 2:
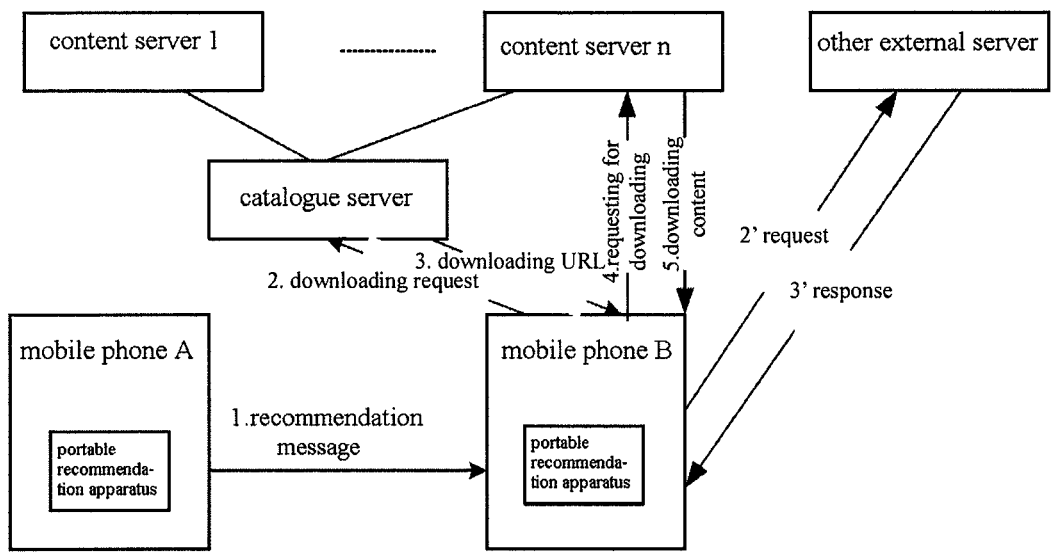
FIG. 2 is schematic diagram showing the method for recommending content among mobile phone users of the present invention.

The communication process among the recommending mobile phone, the mobile phone being recommended to and the server is indicatively shown in FIG. 2.

Figures 1C, 1D:
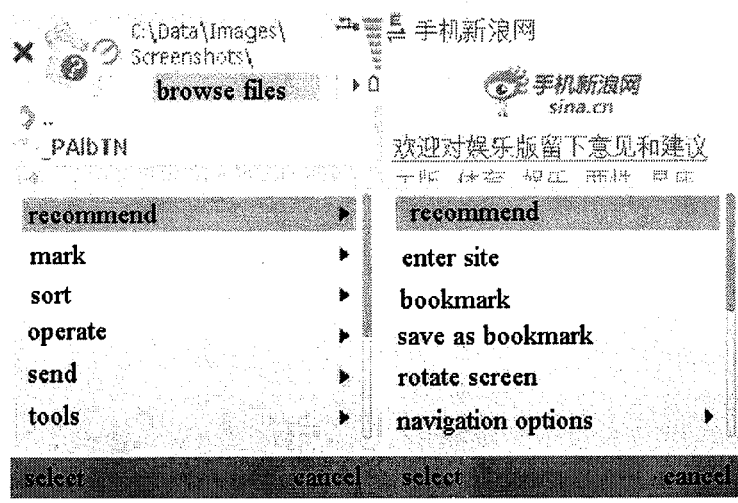

In addition, the user may select the menu item 'recommendation' in the menu of the application software and initiate the recommending operation, as seen in FIG. 1b, the recommending operation is performed through selecting the menu item 'recommendation' in the menu of the application 'Net Qin Mobile Phone Anti-virus'. The user may select the present menu item 'recommendation' to initiate the recommending operation after selecting some file in the resources browser (file manager), as illustrated in FIG. 1c. The user may also select the menu item 'recommendation' in the web browser to make a recommendation (not shown).

The recommendation process of an image, audio and video, electronic book, etc. in the mobile phone is similar with that of the above application (software), excepting that the file manager is responsible for extracting the recommendation message.

In condition of web recommendation, the user selects the menu item 'recommendation' in the web browser and initiates the recommending operation, as illustrated in FIG. 1d. The web browser is responsible for extracting the recommendation information, including URL, web title, and transferring said information to the 'recommendation module' of the mobile phone as a parameter.

The 'recommendation module' of the mobile phone displays a recommendation interface and reminds the user to input (or select from the contact list) the mobile phone number of the user being recommended to. The recommendation interface may also include other contents, such as recommendation reasons and the like, which may be optional. After the user inputs the mobile phone number of the user being recommended to and the recommendation reasons (optional), the 'recommendation module' configures these information as well as the extracted recommendation information into a recommendation message, and adds a special feature code automatically, then transfers it to the mobile phone of the user being recommended to in the form of short message or multimedia message, etc.

The mobile phone of the user being recommended to receives the recommendation message, and the 'monitor and download module' which is running all through at the background monitors and analyzes this message through the additional feature code in the recommendation message. URL, content name and the recommendation reasons can be analyzed from the recommendation message. Subsequently, the 'monitor and download module' pops up a download reminder: startup the browser or not, and asks the user for confirmation. The browser is started up, the network is connected and the 'URL' is opened to browse after the user makes a confirmation.

Several common means of initiating the recommending operation and the recommending processes of different content are indicatively described above. Those skills in the art should understand that the above examples are only illustrative, but not intended to limit the scope of the invention.

The system for recommending content among mobile phone users will be described below. It should be understood that the system only provides basic modules or parts for recommending content among mobile phone users. For the sake of clarity and brevity, the description omits other known parts or modules of the mobile phone or server.

Figure 3:
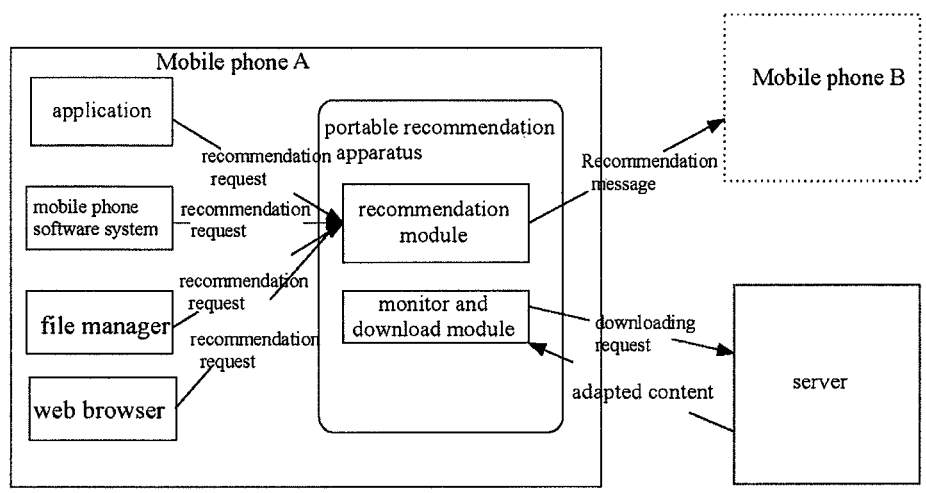
FIG. 3 is block diagram showing the system of recommending content among mobile phone users of the present invention.

Referring to FIG. 3, the system of the invention is based on the framework of the mobile phones and server. The mobile phones recommending contents to each other include a portable recommendation apparatus. The portable recommendation apparatus may comprise: a recommendation module for receiving recommendation request of various source/manners; a displaying recommendation interface, configuring recommendation message and transmitting it to the mobile phone being recommended to; and a monitor and download module which is running all through at the background monitoring inbox of the system (monitoring the received mobile phone message) and then making analysis if said message conforms to the predefined format, reminding the user whether to download or not and executing the subsequent downloading operation.

The server comprises category search information of various contents and the corresponding contents. In addition, the server specially includes database of software-related information and corresponding software content database. Various other contents are, for example, image, audio and video, electronic book, webpage with high click ratio, and so on.

The server may further divide into a catalogue server and a content server.

The catalogue server performs the function of catalogue search, including the database of software-related information, as least including the information of: content name, version content, model, supported languages, and similarity with other software, etc. As an example, the content is shown in the table below:

| Name | Version | Model | Supported Languages | Type/ Keywords | URL |
|---|---|---|---|---|---|
| Mobile Phone Anti-virus | 2.1 | S60 3.1 | Chinese/ English | Safe/ Anti-virus | XXXXX |

The catalogue server performs the function of catalogue search of other content, including the database of other content-related information.

The content server performs the function of storing/downloading software, including other content database.

Although the invention is described above with reference to the embodiments, those skills in the art should understand that the above embodiments are only illustrative, but not limitative. Some features of the above embodiments of the invention can also be used in other embodiments. It is intended that the invention covers all modifications and alternatives defined by the scope of the Claims.

What is claimed is:

1. A system for recommending content among mobile phone users based on a framework including a mobile phone and a server, wherein the system comprises:
   a recommendation module comprising non-transitory computer readable medium executed at the mobile phone for receiving recommendation requests initiated by selecting a menu item, displaying a recommendation interface, configuring a recommendation message, and transmitting the recommendation message to one or more receiving mobile phones; and
   a monitor and download module comprising non-transitory computer readable medium, running as a background process on an operating system of the mobile phone, monitoring an inbox of the mobile phone, and determining if a received recommendation message conforms to a predefined format, providing a download reminder including the results of an analysis, and performing a subsequent downloading operation;
   whereby the server, in communication with the recommendation module and the monitor and download module, is operable to receive information and to perform catalogue searching and storing or downloading based on information received.

2. The system according to claim 1,
   wherein the server comprises a software-related information database and a software content database;
   wherein the software-related information database is configured to provide index of software catalogue, including at least content name, version number, mobile phone model, supported languages, and similarity parameter corresponding to other software;
   the software content database performs the function of storing/downloading of the software.

3. The system according to claim 1,
wherein the server further includes a catalogue server and a content server;
wherein the catalogue server performs the function of catalogue search, and the content server performs the storing/downloading function.

4. The system according to claim 1,
wherein a download reminder further comprises an installation reminder and an alert indicating when installation is completed.

5. The system according to claim 1,
wherein the information comprises at least one of a recommendation type, a content name, or a uniform resource locator (URL) of a browser,
wherein the recommendation type includes webpage or software, and
wherein the content name includes a software name, or version number, and a web title.

6. The system according to claim 1,
wherein the menu item is selected from a group consisting of: a present system menu, an application menu, a web browser menu, or a file manager menu.

7. The system according to claim 1,
wherein the content that can be recommended comprises: software, image, audio and video, ebook, and webpage.

8. A method for recommending content among mobile phone users based on a framework including mobile phones and a server, the method comprising;
recommending content from a first mobile phone, the first mobile phone comprising:
a recommendation module comprising non-transitory computer readable medium executed at the mobile phone for receiving recommendation requests initiated by selecting a menu item, displaying a recommendation interface, configuring a recommendation message, and transmitting the recommendation message; and
receiving content at a second mobile phone, the second mobile phone comprising:
a monitor and download module comprising non-transitory computer readable medium, running as a background process on an operating system of the second mobile phone, monitoring an inbox of the second mobile phone, and determining if a received recommendation message conforms to a predefined format, providing a download reminder including results of an analysis, and performing a subsequent downloading operation; and
sending information to a server, enabling the server to perform catalogue searching and storing or downloading of contents at the server based on the information, the server comprising catalogue searching index and information for various contents.

9. The method according to claim 8, further comprising
providing an index using a software-related information database of the server;
wherein the index comprises at least content name, version number, mobile phone model, supported languages, and similarity parameter corresponding to other software; and
storing/downloading software using a software content database of the server.

10. The method according to claim 8, further comprising
performing the catalogue search function at a catalogue server of the server, and
performing the storing/download function at a content server of the server.

11. The method according to claim 8,
wherein a download reminder further comprises an installation reminder and an alert indicating when installation is completed.

12. The method according to claim 8,
wherein the information comprises a recommendation type, a content name, or a uniform resource locator (URL) of a browser,
wherein the recommendation type includes webpage or software, and
wherein the content name includes a software name, or version number, and a web title.

13. The method according to claim 8,
wherein the menu item is selected from a group consisting of: a present system menu, an application menu, a web browser menu, or a file manager menu.

14. The method according to claim 8,
wherein the content that can be recommended comprises: software, image, audio and video, ebook, and webpage.

* * * * *